US010419547B1

(12) United States Patent
Baturin et al.

(10) Patent No.: US 10,419,547 B1
(45) Date of Patent: Sep. 17, 2019

(54) METHOD AND SYSTEM FOR COMPOSING AND EXECUTING SERVER MIGRATION PROCESS

(71) Applicant: Parallels International GmbH, Schaffhausen (CH)

(72) Inventors: Alexey Baturin, Novosibirsk (RU); Sergey Lystsev, Novosibirsk (RU); Alexey Filatev, Novosibirsk (RU)

(73) Assignee: Plesk International GmbH, Schaffhausen (CH)

( * ) Notice: Subject to any disclaimer, the term of this patent is extended or adjusted under 35 U.S.C. 154(b) by 379 days.

(21) Appl. No.: 15/482,924

(22) Filed: Apr. 10, 2017

(51) Int. Cl.
*H04L 12/24* (2006.01)
*H04L 29/12* (2006.01)
*H04L 29/08* (2006.01)

(52) U.S. Cl.
CPC ............ *H04L 67/148* (2013.01); *H04L 41/02* (2013.01); *H04L 41/022* (2013.01); *H04L 41/0866* (2013.01); *H04L 41/0873* (2013.01); *H04L 61/1511* (2013.01); *H04L 67/1095* (2013.01)

(58) Field of Classification Search
CPC ....... H04L 41/00; H04L 41/02; H04L 41/022; H04L 41/0226; H04L 41/08–0806; H04L 41/0866; H04L 41/0873; H04L 61/00; H04L 61/10; H04L 61/15; H04L 61/1511; H04L 67/00; H04L 67/10; H04L 67/1095; H04L 67/14; H04L 67/148
See application file for complete search history.

(56) References Cited

U.S. PATENT DOCUMENTS

| 6,711,624 | B1 * | 3/2004 | Narurkar | G06F 16/258 |
| | | | | 719/321 |
| 6,828,963 | B1 * | 12/2004 | Rappoport | G06F 16/29 |
| | | | | 345/419 |
| 7,346,635 | B2 * | 3/2008 | Whitten | G06F 16/214 |
| 8,200,634 | B2 * | 6/2012 | Driesen | G06F 8/65 |
| | | | | 707/641 |

(Continued)

OTHER PUBLICATIONS

Rob, "Migrating from Plesk to cPanel via commandline" Jun. 19, 2013, LinuxBrigade.*

(Continued)

*Primary Examiner* — Michael A Keller
*Assistant Examiner* — Boris D Grijalva Lobos
(74) *Attorney, Agent, or Firm* — Bardmesser Law Group

(57) ABSTRACT

A method for migration of hosting environment, includes creating a base workflow as a tree of leaf and compound actions; detecting a control panel type on a target machine; applying workflow extensions to the base workflow for the control panel type on the target machine, to generate an extended workflow; detecting a control panel type on a source machine, wherein the control panel type on the target machine may be different from the control panel type on the source machine; applying additional workflow extensions to the extended workflow for the control panel type on the source machine, to generate a final workflow; and executing the final workflow to migrate a hosting environment from the source machine to the target machine and from the control panel type on the source machine to the control panel type on the target machine, using one of four execution modes: sequential, sequential-batch, parallel and parallel-batch.

18 Claims, 12 Drawing Sheets

(56) References Cited

U.S. PATENT DOCUMENTS

| | | | | |
|---|---|---|---|---|
| 8,285,817 B1* | 10/2012 | Balasubramanian | | G06F 16/119 |
| | | | | 709/219 |
| 8,332,828 B2* | 12/2012 | Vargas | | G06F 8/51 |
| | | | | 717/136 |
| 8,769,059 B1* | 7/2014 | Chheda | | H04L 41/0866 |
| | | | | 705/26.5 |
| 9,075,811 B2* | 7/2015 | Nayyar | | G06F 16/119 |
| 9,197,502 B1* | 11/2015 | Chheda | | G06Q 20/085 |
| 9,244,731 B2* | 1/2016 | Siu | | G06F 9/4856 |
| 9,244,822 B2* | 1/2016 | Tamilmani | | G06F 11/3696 |
| 9,396,004 B1* | 7/2016 | Bester | | G06F 9/44505 |
| 9,648,134 B2* | 5/2017 | Frank | | G06F 9/4856 |
| 9,712,455 B1* | 7/2017 | Mittal | | H04L 47/762 |
| 10,282,433 B1* | 5/2019 | Caruso | | G06F 3/0652 |
| 2005/0198352 A1* | 9/2005 | Fleck | | H04L 29/06 |
| | | | | 709/232 |
| 2005/0278432 A1* | 12/2005 | Feinleib | | G06F 9/4451 |
| | | | | 709/213 |
| 2006/0064474 A1* | 3/2006 | Feinleib | | G06F 8/63 |
| | | | | 709/220 |
| 2006/0184561 A1* | 8/2006 | Terada | | G06F 16/214 |
| 2006/0288115 A1* | 12/2006 | Neuman | | H04L 29/12594 |
| | | | | 709/232 |
| 2007/0220248 A1* | 9/2007 | Bittlingmayer | | G06F 9/44505 |
| | | | | 713/100 |
| 2010/0299130 A1* | 11/2010 | Mitsuzawa | | G06F 9/4856 |
| | | | | 703/26 |
| 2013/0019230 A1* | 1/2013 | Nakanishi | | G06F 11/3419 |
| | | | | 717/149 |
| 2014/0019974 A1* | 1/2014 | Siu | | G06F 9/4856 |
| | | | | 718/1 |
| 2014/0208049 A1* | 7/2014 | Furusawa | | G06F 3/0647 |
| | | | | 711/162 |
| 2014/0229910 A1* | 8/2014 | Frenkiel | | G06F 8/51 |
| | | | | 717/104 |
| 2015/0124656 A1* | 5/2015 | Yamada | | H04L 12/44 |
| | | | | 370/256 |
| 2015/0207887 A1* | 7/2015 | Feinleib | | H04L 67/02 |
| | | | | 709/219 |
| 2016/0164722 A1* | 6/2016 | Zhu | | G06F 16/27 |
| | | | | 709/221 |
| 2016/0306648 A1* | 10/2016 | Deguillard | | G06F 9/45558 |
| 2017/0147371 A1* | 5/2017 | Tsirkin | | G06F 9/45558 |
| 2017/0289643 A1* | 10/2017 | Kachkova | | H04N 21/4312 |

OTHER PUBLICATIONS

Whuk et al., "Moving from cPanel to Plesk" Feb. 1, 2012, Web Hosting UK (Whuk).*

* cited by examiner

METHOD AND SYSTEM FOR COMPOSING AND EXECUTING SERVER MIGRATION PROCESS

BACKGROUND OF THE INVENTION

Field of the Invention

The invention relates to server migration, and, more particular, to constructing a migration schema and migrating from one server with control panel to another server with different or the same control panel.

Description of the Related Art

The industry trend of using shared hosting environments presents some challenges with regard to migration, which causes significant migration time, significant usage of computer and human resources and significant downtime of services. The reasons for migration can be outdated software on the source server, old hardware, maintenance of hardware, a need to move high-load sites to separate server, etc.

Migration of large shared hosting environments consisting of hundreds of servers could take months. During that time service provider has to maintain both old and new servers. If a service provider migrates from one shared hosting panel to another one, it is required to maintain both panels. This results in additional costs. The migration process itself is complex and requires additional attention from server administrators, and consumes their time and resources of the cluster. End-customers of shared hosting require to minimize downtime of their services (websites and mail) during migration. Therefore, in most cases, it is desired to minimize the time of migration.

Shared hosting environment is typically represented by several domains (that can be owned by different people) with different services located on the same physical or virtual server. Typical services are: web, database, mail, domain name system (DNS), etc. There can be different reasons for migration of shared hosting environment to another server.

Given the many years in which the hosting industry has developed, there are now many control panels which help to configure hosting services and perform typical tasks. A data center might have a large number of hardware nodes, with (for example) 500 nodes with a control panel from vendor A, 300 nodes with a control panel from vendor B, 200 nodes with a control panel from vendor C, and so on. Often it is desired to migrate all the hosting services to a single modern control panel (such as PLESK) to increase uniformity, decrease maintenance costs, to give all users the same capabilities, and take advantages of modern features, like Node.js hosting, modern PHP and .NET framework versions, DNSSEC support and so on.

Each of the control panels has its own set of features and provides its own way to configure services. Different control panels store configuration data in different ways: some of them use configuration files, some of them use databases or database servers. Configuration files format, database schemas and files layout are often different for different vendors. Different panels work on different platforms (Windows, Linux, FreeBSD) and use different set of software: web servers (Apache, nginx, ITS), mail servers (Postfix, QMail, SmarterMail), DNS servers, and so on. A service provider often wants to have a simple and cheap way to construct an algorithm for migration from various different panels.

One more issue has to do with tracking progress of migration. During migration, a set of multiple operations should be performed for each migrated object. The administrator may want to see which operations were performed, which ones are "hanging", and which are still queued. Additionally, the migration process should be more reliable by isolating different operations from each other. For example, even if some DNS record was not migrated, still, the mail messages should be copied as if they were independent. Failure of one action should generally not result in failure of others. Examples of such isolated actions can include, for example, creating a DNS zone, copying of files, creation of a domain, copying of files of a website, copying of a mailbox, etc.

The administrator also might want to group such migration activities to see the status of the migration (e.g., to see if the mailboxes for all the users have been copied, or if the website files for multiple websites have been copied, and so on).

Conventionally, to minimize the time of migration, a service provider could get more powerful hardware, or hire additional operators to perform the migration. However, with large numbers of migrated servers, this is expensive.

Accordingly, it is desired to have an efficient method for composing and executing a migration schema for hosting environments controlled by multiple different control panels. The method should be aimed to minimize time of migration and usage of additional resources (hardware, migration operators), and minimize development time for each new source hosting panel.

SUMMARY OF THE INVENTION

The invention relates to a migration of a server or a hosting environment, and more particularly, to a migration of servers and hosting environments controlled by multiple different control panels that substantially obviates one or more disadvantages of the related art.

An object of the invention is to provide an option for easy changes to migration algorithm for different situations (different source panel types, platforms, hosting services software). Another object is to provide effective ways to execute the migration algorithm minimizing migration time, hosting services downtime, load on the servers involved in the migration and usage of human resources. Another object is to provide visible tracking of migration progress and isolation of different operation.

In one aspect, a method, system and computer product for migration of hosting environment, includes creating a base workflow; detecting a control panel type on a target machine; applying workflow extensions to the base workflow for the control panel type on the target machine, to generate an extended workflow; detecting a control panel type on a source machine, wherein the control panel type on the target machine may be different from the control panel type on the source machine; applying additional workflow extensions to the extended workflow for the control panel type on the source machine, to generate a final workflow; and executing the final workflow to migrate a hosting environment from the source machine to the target machine and from the control panel type on the source machine to the control panel type on the target machine.

Optionally, the applying workflow extensions to the base workflow includes any of inserting, deleting and modifying operations in the base workflow. Optionally, the base workflow is organized into a tree including leaf actions and compound actions, wherein a leaf action is an atomic migration operation, and the compound action is a combination of multiple leaf actions, multiple compound actions, a leaf action and a compound action, or multiple leaf actions and multiple compound actions. Optionally, the leaf actions are any of per-object actions and common actions. Optionally, the final workflow is initiated through an entry point. Optionally, prior to the executing step the following is done: making a flat list of leaf actions and compound actions with full list of their parents; grouping the leaf actions and compound actions by object; composing separate action trees by objects; and grouping the separate action trees into a single tree.

In another aspect, a system for migration of a hosting environment includes means for creating a base workflow; means for detecting a control panel type on a target machine; means for applying workflow extensions to the base workflow for the control panel type on the target machine, to generate an extended workflow; means for detecting a control panel type on a source machine. The control panel type on the target machine is different from the control panel type on the source machine. The system also includes means for applying additional workflow extensions to the extended workflow for the control panel type on the source machine, to generate a final workflow; and means for executing the final workflow to migrate a hosting environment from the source machine to the target machine and from the control panel type on the source machine to the control panel type on the target machine. The means in question are implemented as computer code running on a processor of the hardware node (source and/or target machine).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
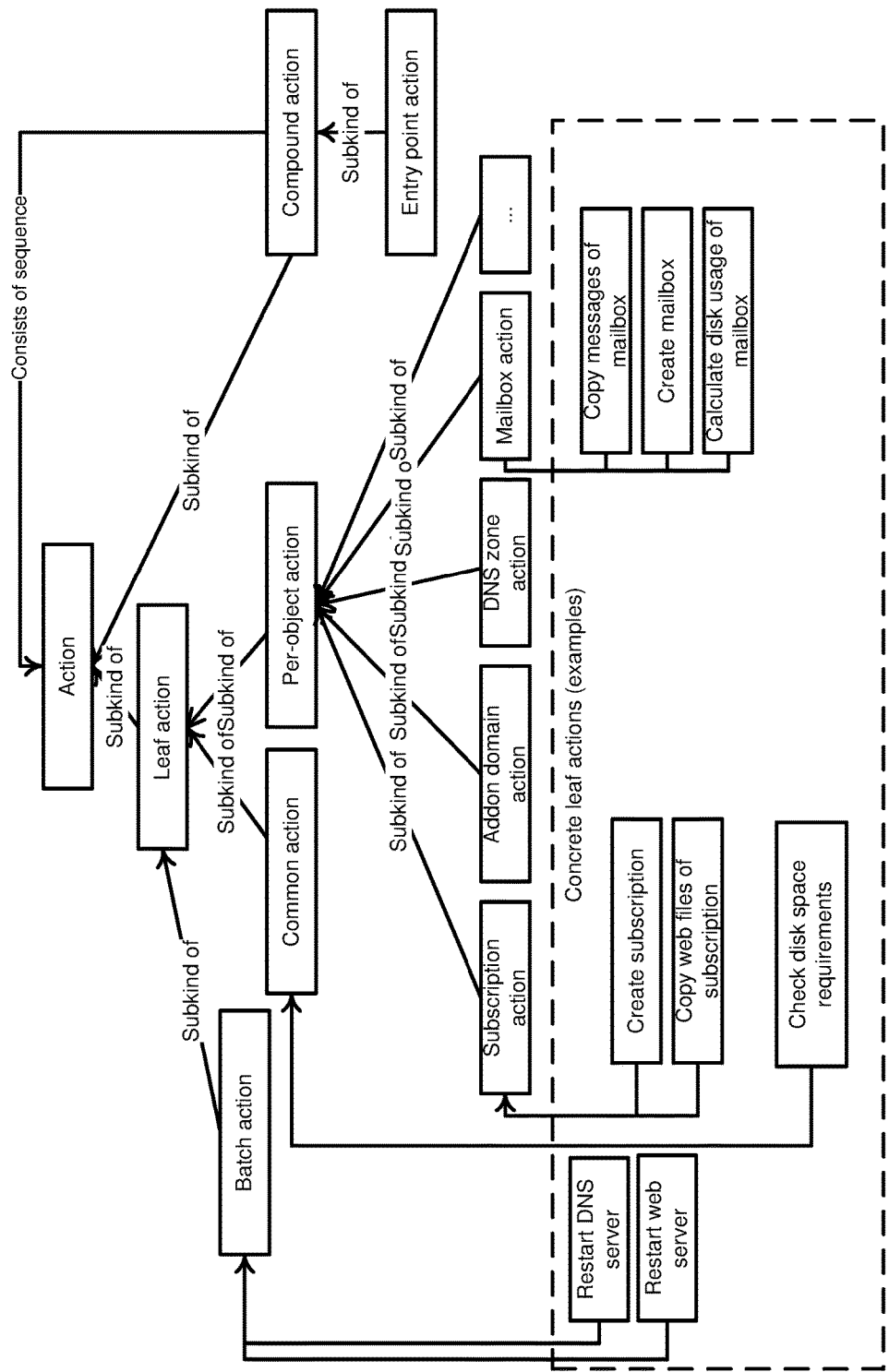
FIG. 1 illustrates what types of actions are contemplated, and the hierarchy of such migration actions.

Reference will now be made in detail to the preferred embodiments of the present invention, examples of which are illustrated in the accompanying drawings.

The following definitions are used throughout the description.

Shared hosting server—a physical or virtual server where several domains are hosted at the same time. Hosting means providing some services specific for that domain—a web service, a mail service, a database and DNS, for example.

Source shared hosting server—a shared hosting server from which domains are to be migrated.

Target shared hosting server—a shared hosting server to which domains are to be migrated.

Migrator—an executable program module installed on the target server, which provides a user interface and controls a process (workflow) of migration. The migrator runs necessary software to transfer data, synchronize content, and other operations necessary for migration.

Migration operator—a person who performs the migration with the help of the migrator.

Migration developer—a person who customizes migration for given source and destination servers.

Domain owner—a person who owns a domain and manages services of the domain on a shared hosting server.

Shared hosting panel—a software which simplifies management of hosting services for shared hosting server owner of domain owners. Examples of shared hosting panels are PLESK or cPanel.

Hosting object—an abstraction of shared hosting control panel, which provides some functionality to server administrator or domain owner. Examples of hosting objects for PLESK control panel: customer, reseller, hosting subscription, hosting plan, addon domain, subdomain, domain alias, DNS zone, DNS record, mailbox, database, web application, virtual directory, protected directory, system user, FTP user.

Action—abstraction over something executed during migration process necessary to perform the migration. Actions are classified in the following way: there are leaf actions, compound action, entry point actions, batch actions, per-object actions and common actions.

Leaf action—executable program or block of code, which is responsible for one small part of migration process. It implements specific interface to execute the action and provide meta-information, such as action name, failure message, parallel execution properties, logging properties and so on. Typically for shared hosting migration there are from 15 to 200 leaf actions, depending on the source and target shared hosting panel complexity. Examples of leaf actions are such things as: "get information from source panel as XML", "create domain on the target server", "create mailbox on the target server", "create database on the target server", "restore web hosting configuration" (PHP settings, .NET framework settings, etc), "transfer web files", "transfer mail messages", "transfer database tables", "perform post-migration checks for web sites", "perform post-migration checks for mailboxes", "perform post-migration checks for databases" and so on.

Compound action—block of code or configuration file which describes ordered sequence of actions to be executed to perform migration. That sequence could consist of leaf actions and other compound actions. Compound actions group leaf actions and other compound actions. For example, compound action "transfer content" may include leaf actions "transfer web files", "transfer mail messages", "transfer database tables. Compound action "perform post-migration checks" may include leaf actions "perform post-migration checks for web sites", "perform post-migration checks for mailboxes", "perform post-migration checks for databases".

Entry point—root compound action, which includes all actions required to perform migration or other auxiliary operation such as post-migration checks. Examples of entry points: "pre-migration checks" (perform checks before migration and give recommendations to migration operator), "migration" (migration itself, when hosting objects are created and configured on target panel, files, mail messages and databases are transferred), "post-migration checks" (perform post-migration checks which ensure that everything was migrated well and websites work on the target server in the same way as on the source server).

Migration workflow—group of entry points which contains all required and optional operations for migration.

Each leaf action can be classified by type of migrated object: there are common actions and per-object actions.

Common action—action not related to any object, and performed as bulk during migration.

Per-object actions can be the following: subscription action, mailbox action, add-on domain action, DNS zone action, database action, etc.—these are examples of actions which should be executed for each corresponding hosting object, e.g., subscription, mailbox, add-on domain, and so on.

Batch action—a type of per-object action, which could be executed once for several objects. For example, if a per-object action executed for each migrated domain, which writes Apache configuration file for domain, there could be a corresponding batch action which restarts the Apache web server. Several configuration files can be written for different domains, and then restart the web server once.

The following is an overview of the migration process:
1. Migrator has a core workflow called shared hosting workflow.
2. For each source/target panel, migrator developer implements leaf actions.
3. For each source/target panel, migrator developer creates special file—workflow extension, which describes how migration from that panel extends shared hosting workflow. Migrator developer puts the file into special directory, which contains all workflow extensions.
4. Migration operator starts migration from one particular source server to the other particular target server in the following way:
4.1. Migration operator creates configuration file, where he/she sets how actions should be processed by migrator.
4.2. Migration operator starts the migrator tool.
5. Migrator detects source and target panels and loads corresponding workflows from the special directory with workflow extensions.
6. Migrator starts executing actions in one of the following ways according to configuration file created by migration operator:
sequential
sequential-batch
parallel
parallel-batch 7. Once an action is executed for one hosting object, migrator updates status file, so migrator operator could see the progress. When the When migrator executes an action for an object, it isolates it from other actions executed for other objects.

The concept relies on two interconnected parts:
1. Composing migration for specific source and target panels; and
2. Execution of the migration.

Migration workflow is built by combining leaf and compound actions into entry points by the migration developer. As a result an ordered tree of actions is generated. Each action in the tree could be addressed by sequence of parent action identifiers and identifier of the action itself. For example, "copy web files" action could be addressed as: "migration"/"transfer content"/"transfer web files".

Migration of a typical shared hosting has common operations, which are applicable for all panels. Such operations form a "shared hosting workflow". Considering differences between source panels, each source panel would normally have its own workflow with its own set of actions. The same is applicable for target panels as well. For each source panel, and each target panel, it is proposed to have a special configuration file, called workflow extension, which describes how it extends base shared hosting workflow.

The migration developer creates actions specific to source or target panel and puts them into shared hosting workflow with the help of that configuration file. The configuration file is put into special directory with workflow extensions (for example, C:\Migrator\WorkflowExtensions\Source for source panels and C:\Migrator\WorkflowExtensions\Target for target panels) by migration developer and has name which corresponds to panel (for example "PLESK.xml" or "cpanel.xml" if the workflow extension is in XML, other formats are possible too). Further, the migrator will use that workflow extension when migrating to specific source panel or from specific target panel.

Workflow extension is described by a sequence of elements. There are 3 types of elements:
1. Add new action to a parent workflow.
2. Remove an action from a parent workflow.
3. Replace an action in a parent workflow.

For each element, an address is specified. When adding a new action, it could be added before or after an action at specified address, at the beginning or at the end of compound action at specified address. When removing or replacing an action, an action to remove/replace is specified by the address.

To build a final workflow, the following algorithm is used:
1. Base workflow (shared hosting workflow) is created.
2. Target panel type is detected automatically by migrator or read from text configuration file of migrator, where it is specified manually by migrator operator.
3. According to target panel type, migrator looks for workflow extension file in workflow extension directory. If the file is found—corresponding workflow extension is loaded and applied to the base workflow.
4. Source panel type is detected automatically by migrator or read from text configuration file of migrator, where it is specified manually by the migrator operator.
5. According to source panel type, a corresponding workflow extension is loaded in the same way as for the target panel. Then, it is applied to workflow from step #3.

Finally, the workflow is executed to perform migration or any auxiliary operation.

Execution of Workflow

Once the workflow is built, it is executed by the migrator:

1. The migrator makes a flat structure out of a workflow tree: i.e., a list of leaf actions, with their parents.
2. The migrator divides list of action into blocks: each block consists completely of per-object actions of the same type, or completely of common actions.
3. For each block, migrator builds a tree of actions in that block.
4. Migrator start processing each block. If the block is a common action block, migrator walks the tree depth-first, running each leaf action. If the block is a per-object action block, migrator runs per-object action block processor.

Per-object block processor can work in several modes described: sequential, sequential-batch, parallel and parallel-batch. The mode is selected manually by migrator operator according to requirements to migration of specific environment.

In a sequential mode, each hosting object is migrated one-by-one: all actions are performed for the first object, the all actions are performed for the second object, and so on. That gives less load on the servers involved in the migration, and is more reliable, as no race conditions are possible. Also, it is the slowest method when migrating multiple hosting objects. However, it has an advantage in that the migrator operator gets results of objects migration one-by-one, not at the end of the whole migration execution, so for example he/she could start manual post-migration verification or switch to production more quickly once the first object is migrated.

In a sequential-batch mode, each hosting object is migrated as follows: the first action is executed for each hosting object, then the second action is executed for each hosting object, and so on. Additional batch actions could exist which improve speed of migration and decrease load on the servers. For example, for DNS zone configuration action, which is performed for each migrated domain, a single batch DNS server restart action may exist. Advantages of this approach are: no race conditions are possible, low load on source and destination servers, less overall migration time and overall load. Disadvantages are: less speed of migration comparing to parallel modes of migration, migration operator gets results of migration only once all hosting objects are migrated.

Parallel mode is aimed to minimize migration time by using multi-core (multi-processor) systems and parallel I/O advantages. In that mode, the migration tool starts pool of threads or processes. A number of threads/processes is configured by migration operator. The migration tool creates a queue, and puts all hosting objects are put into it. Each thread/process takes an object from the queue and executes actions one-by-one. Once all actions are performed for a single object, the thread/process takes the next object and executes actions one-by-one. This continues until all hosting objects are migrated. Advantages are: migration speed and more effective usage of computer resources, the migration operator gets results of hosting objects migration one-by-one. Disadvantages are: more load on source and destination servers.

A hybrid parallel-batch mode takes benefits of both parallel and sequential-batch modes. It works in the same way as parallel mode, but batch actions are executed once specific number of objects were processes. For example, if number of objects is set to 5, restart DNS server action is performed once 5 DNS zones were configured in the DNS server. That reduces load on source and destination servers, and decreases overall migration time. Still, the migration operator gets results of migration only once a batch of hosting objects are migrated.

As the workflow tree is split over multiple trees, it is still easy to track the progress of migration and see which actions were already executed for each kind of object. Each leaf action could be isolated from each other, for example by running it in a separate process or thread.

In sum, the proposed approach has the following advantages:

1. It provides various ways to execute migration. Each of the ways has at least one of the following properties important for migration process:
   it minimizes overall migration time
   it minimizes per-object migration time
   it provides more efficient usage of multi-core/multi-processor systems and parallel I/O
   it providing less load on source and destination servers.
2. It allows to make inexpensive changes to migration algorithm for different situations: different source panel types, platforms, hosting services software.
3. It provides visible tracking of migration progress. Migration workflow is built as an ordered tree of actions, while actions are grouped into compound actions. Every moment migration operator could see which actions/group of actions were executed, and which are to be executed.
4. It provides isolation of different operations: when one action fails for one object, migration still continues to the next action/object. No additional efforts are required to keep that property when adding new source or destination panel.

An example of workflow extension in form of XML is provided in appendix i.

An example of configuration file for migration is provided in appendix ii.

FIGS. 1-5 generally illustrate how the migration process is organized and constructed, and FIGS. 6-11 illustrate how the migration process is performed.

FIG. 1 illustrates what types of actions are contemplated, and the hierarchy of such migration actions. The action is typically a piece of executable code or a script that performs the specified activity. It also typically has provisions for informing the user, if necessary, for how to handle errors, and any additional properties required to perform the specific action. The key point here is that the action is normally performed by a piece of code that is dedicated for one specific and limited operation with particular objects or object. Such an action, where the action is a leaf action, may be thought of as atomic. Examples of a leaf action can be creation of a mailbox, copying of content of a website, deletion of a website, creation of a domain, copying of files corresponding to a mailbox, deletion of a mailbox, and so on.

Leaf actions can be of two types—common actions, and per-object actions. Common actions are performed once for the entire migration process. An example might be checking disk space requirements, to ensure that the target server has sufficient disk space for the migration—this is normally performed only once for the migration process.

Per-object actions are typically performed multiple times during the migration, depending on the number of objects involved. Examples of hosting objects can be subscriptions, add-on domains, DNS zones, mailboxes, and so on. Corresponding actions may include creating a subscription, creating an add-on domain, configuring web service for add-on domain, creating a DNS zone, configuring DNS zone records, creating a mailbox, calculating disk usage of a mailbox, copying messages of a mailbox, and so on. The point is, that if there are 10 mailboxes that need to be created and set up, then the "create mailbox" action will be executed 10 times—once per each mailbox.

The actions are grouped into a tree, forming compound actions—each compound action includes either multiple leaf actions, or multiple compound actions, or some combination of the two. For example, copying of a website can involve multiple actions, such as copying of a mailbox, copying of a database, and copying of files representing a website visualization component. An entry point action is what the administrator sees in his interface—in other words, it is how the administrator initiates the action in question. Another example of an entry point would be initiating a migration, or synchronizing content between two nodes, or data verification post-migration.

Figure 2:
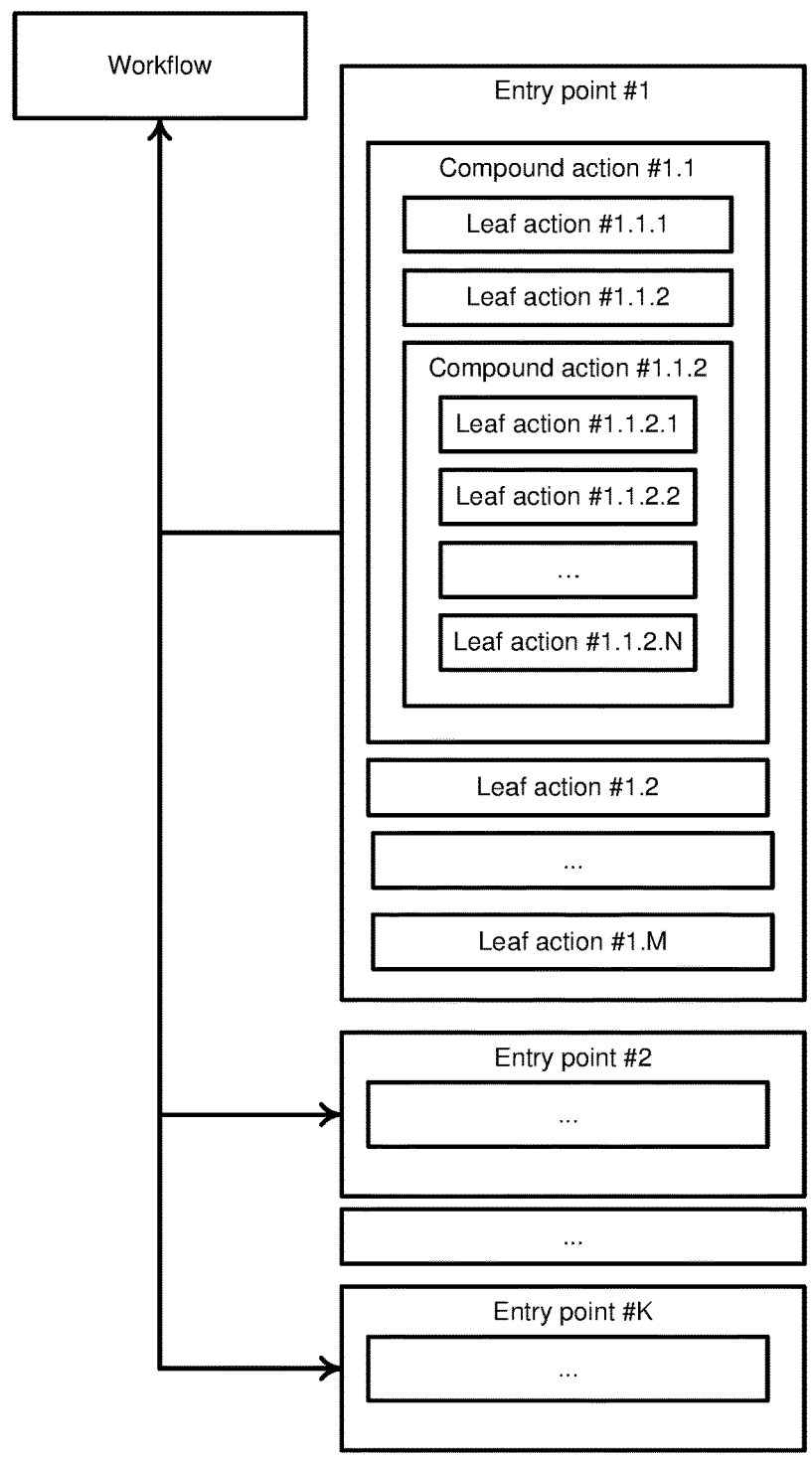
FIG. 2 illustrates an example of what workflow is.

FIG. 2 illustrates an example of what workflow is. A workflow can include multiple entry points. Each such entry point can include one or more compound actions, or one or more leaf actions, or some combination of the two. Conceptually, the leaf actions are at the bottom of the tree hierarchy. The leaf actions may be thought of as atomic operations from which the migration process is constructed. Note also that a compound action represents an ordered set of sub-actions—in other words, if migration of a mailbox is at issue, then the mailbox first needs to be set up on the target computer, and then the relevant files are copied from the source computer (as opposed to the other way around). In other words, the ordering of the actions is important as well.

Figure 3:
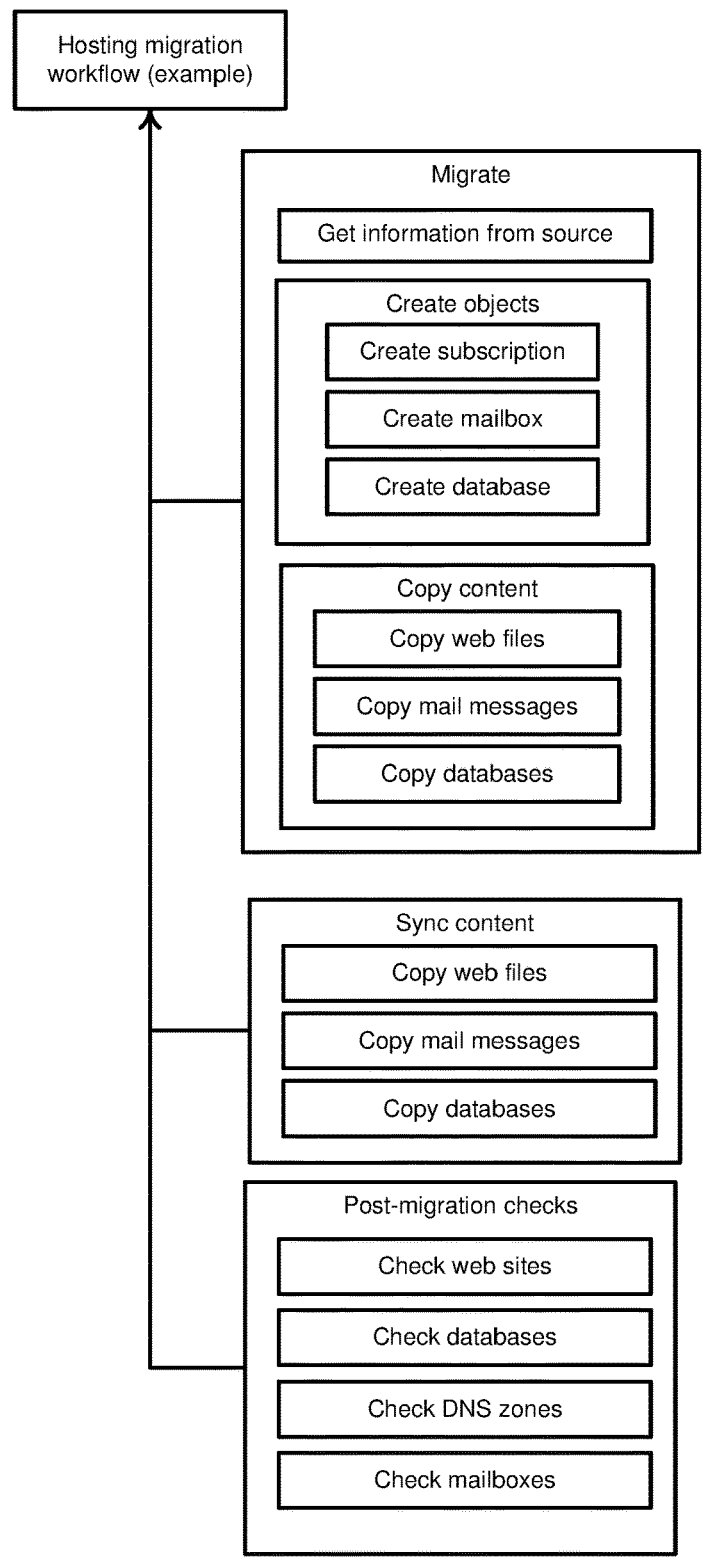
FIG. 3 illustrates a specific example of a workflow relating to shared hosting migration.

FIG. 3 illustrates a specific example of a workflow relating to hosting migration. This example is somewhat realistic, in the sense that it illustrates actual operations that take place. It should be noted that, as a practical matter, such a workflow can often include hundreds of leaf actions and compound actions, rather than the handful that are illustrated in FIG. 3.

In this example of the workflow, the migration workflow consists of essentially three parts—the migration itself, the synchronization part (in order to reduce the downtime of the site), and any post migration verifications and checks for consistency and functionality. The migration itself consists of three parts—getting the information from the source node, including any database parameters, configuration files, etc. The second part is creation of the objects relevant to the migration on the destination server—such as subscriptions, mailboxes, and databases. The third part is the copying of the content itself, such as copying of the web files, copying of the mail messages, and copying of the databases. Similarly, the synchronization part has, in this example, three actions—copying the web files, copying the mail messages, and copying the databases to the extent that the previously copied versions are inconsistent with the version that still remains on the source server. And, similarly, the post migration checks include checking the websites for any configuration or functionality issues, checking the databases for any configuration or functionality issues, checking the DNS zones, checking the mailboxes, and so on.

The hierarchy illustrated in FIG. 3 is applicable to virtually every control panel and hosting environment, from virtually every vendor—the general steps described above and illustrated in these figures occur in virtually all hosting environment migrations and panel migrations, regardless of the vendor, possibly with some minor variations—but the general approach is consistent, and consistent with what is illustrated in these figures. Some of the operations might look somewhat different, or some of the migrations schemes might have additional steps, but the overall framework should be consistent with the above. Thus, given that the workflow may need to be modified for each source and target control panel, FIG. 4 illustrates the concept of adding or removing actions from the workflow.

Figure 4:
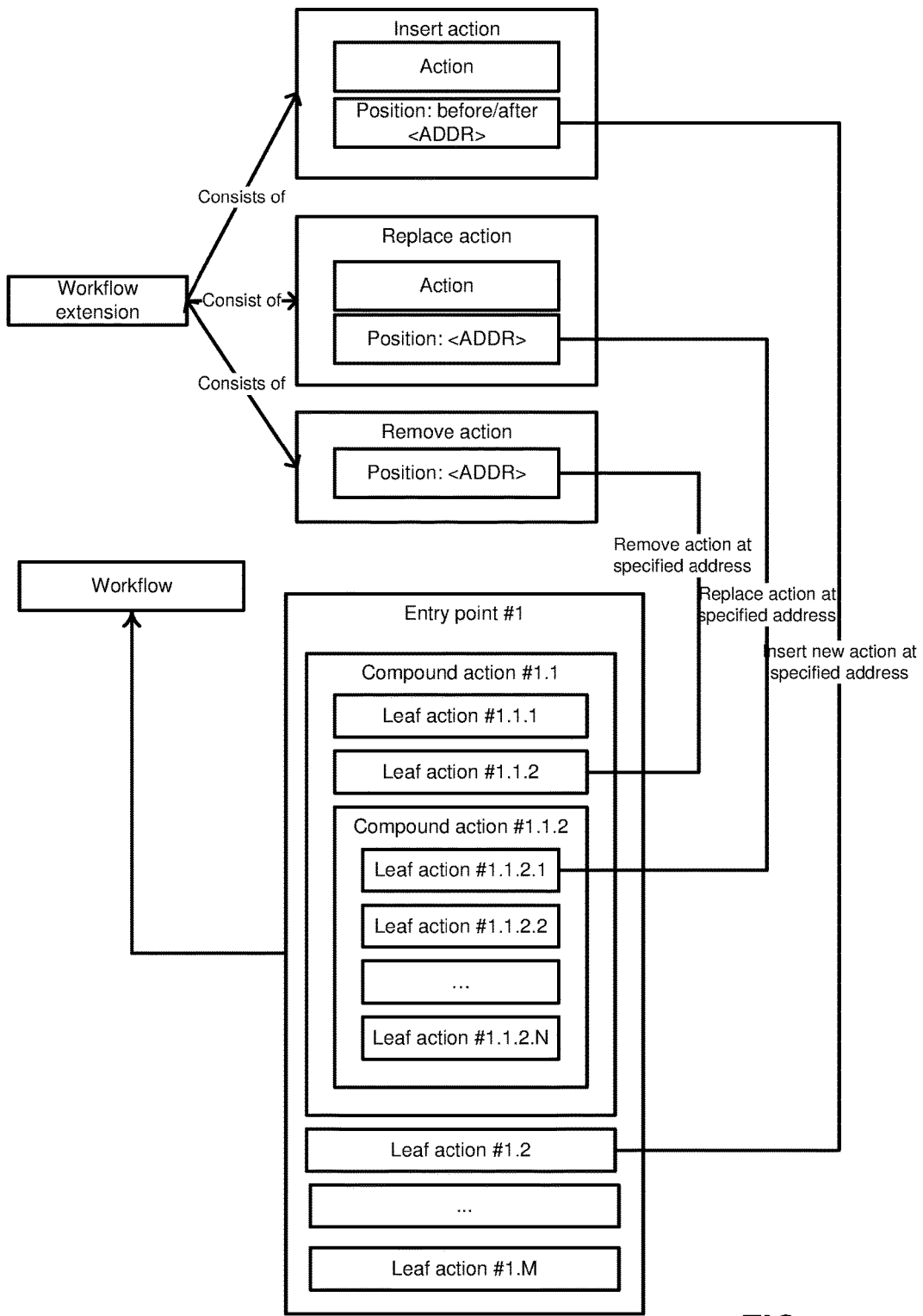
FIG. 4 illustrates the concept of adding or removing actions from the workflow.

As shown in FIG. 4, the concept of workflow extension relies on three types of operation—insertion (or addition) of an action to the workflow, replacement of an action in the workflow, and removal of an action from the workflow. For each such operation, an address where the operation needs to be applied, is specified. The address essentially represents a position in a tree—there is no specific requirement for how to specify the address, except that it must be clear when constructing the tree where the operation is supposed to take place. For example, each entry in a tree can have a line identifier, and each entry can have a path in the tree for getting to that entry. A separator can be used to designate a path, or multiple such separators—such as slashes, semicolons, or any other acceptable separator. In other words, the address, in one example, can be specified as a string of line identifiers, separated by the acceptable separator (such as a slash).

In the context of FIG. 4, the address points to a location in the tree where the change (whatever the change is—insert, replace, remove) needs to be made. The workflow extension and the addressing can be implemented in such languages as Python, XML, JSON, and any number of others—the concept is not particularly limited to any particular language.

Figure 5:
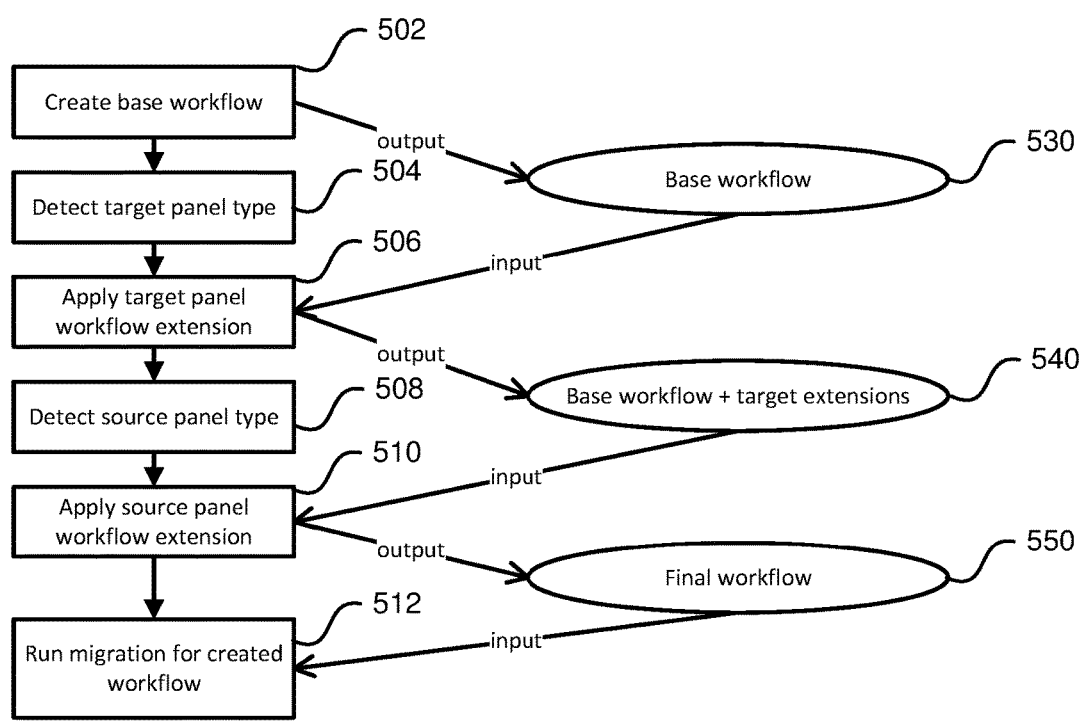
FIG. 5 illustrates how workflow is created for migration from one control panel to a different control panel.

FIG. 5 illustrates how workflow is created for migration from one control panel to a different control panel. As shown in FIG. 5, the process starts with creating a base workflow (step 502), which is essentially a generic workflow that is applicable to almost every control panel—the base workflow is designated by 530. Next, in step 504, the panel type on the target node is detected. This is usually done automatically, by examining such indirect indicators as configuration files, or other files that are known to be associated with a particular control panel from a particular vendor. Also, some database entries or other settings are often indicative of the type of the control panel on the target node.

Then, in step 506, the workflow extensions applicable to the particular panel type are loaded and added to the workflow, to generate the base workflow plus target extensions (designated 540 on FIG. 5). Then, in step 508, the source panel type is detected, in a similar manner to the target panel type detection in step 504, described above. In step 510, the workflow extensions for the source panel are added to the workflow, to generate the final workflow 550. In step 512, the migration process can now be run.

In some cases, if for whatever reason the automatic detection of the target and source panels fails, the administrator can manually designate the target and source panels, for example, from a list offered to him. However, in most cases, based on the settings, the files, the directories, it is usually possible to identify the target and source panels.

FIGS. 6-11 illustrate execution of the workflow, showing the possibilities of both sequential and parallel execution, as well as the principles of isolation and visual tracking of the process of migration that is available to the administrator.

Figure 6:
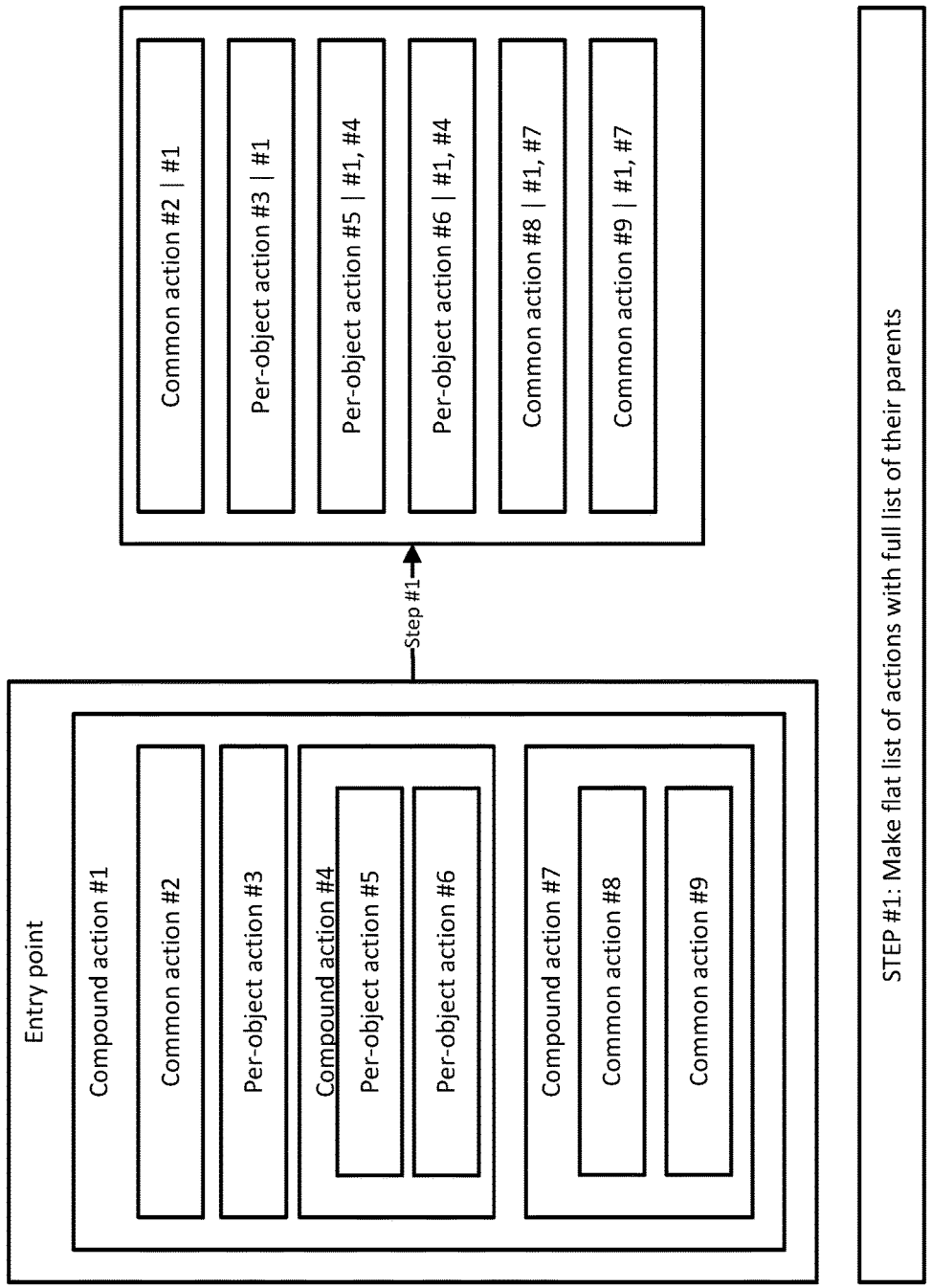
FIG. 6 illustrates the process of creating a flat structure out of workflow tree.

FIG. 6 illustrates the first step—converting a pre-structure that represents the workflow in to a flat structure. The flat structure represents a sequence of leaf actions, generated from the original tree. As may be seen from the right half of FIG. 6, for each action, there is also an entry that identifies the parents of that action.

Figure 7:
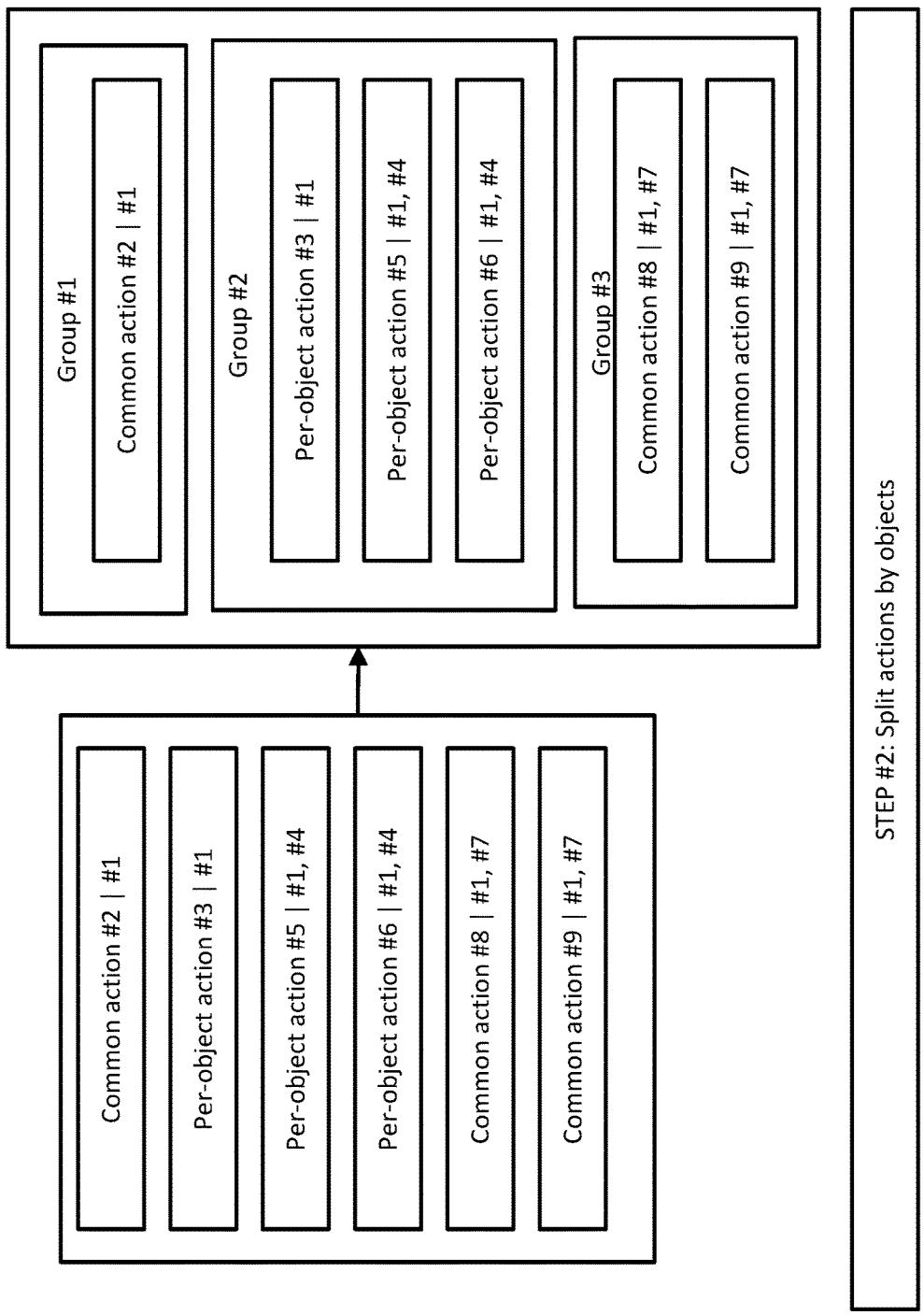
FIG. 7 illustrates the grouping of the leaf actions in the flat structure.

FIG. 7 illustrates the second step—grouping of the leaf actions in the flat structure. As may be seen in FIG. 7, the actions are grouped so that only actions performed on objects of the same type are grouped together, or common actions are grouped together. An example would be that all actions on subscriptions would be grouped together, or all actions on migrating a mailbox (or mailboxes) would be grouped together, or all actions to create DNS zones would be grouped together, and so on. In general, it makes sense to group as many actions as possible into a single group, to the extent practical, and consistent with the notion that all the actions in that group relates to the same type of operations on the same types of objects.

Figure 8:
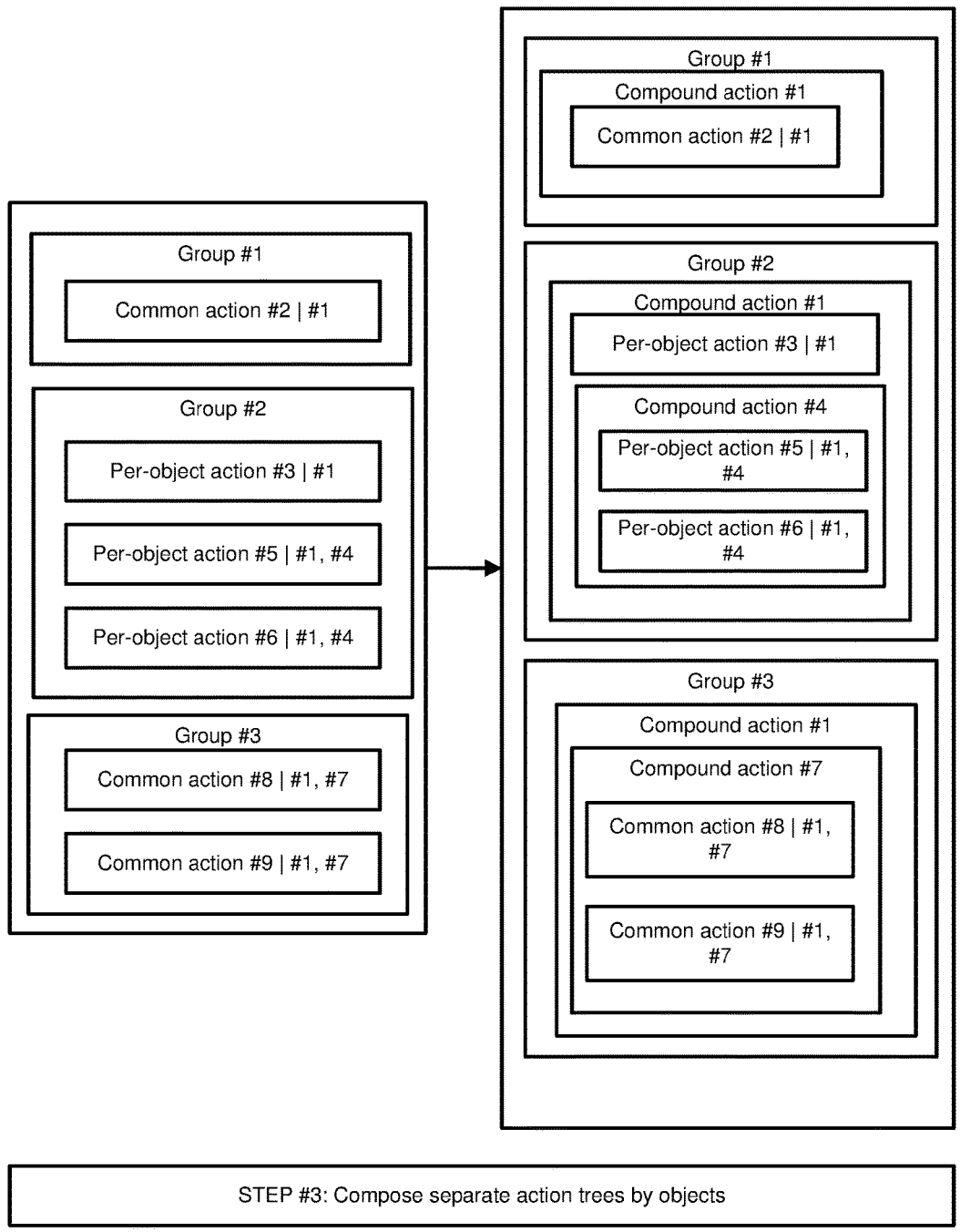
FIG. 8 illustrates the process of reconstructing the tree for each group.

FIG. 8 illustrates the reverse process, of reconstructing the tree for each group. Thus, from the original large tree, we now have three smaller trees, with the actions grouped according to object type, and according to whether they're common or not.

Figure 9:
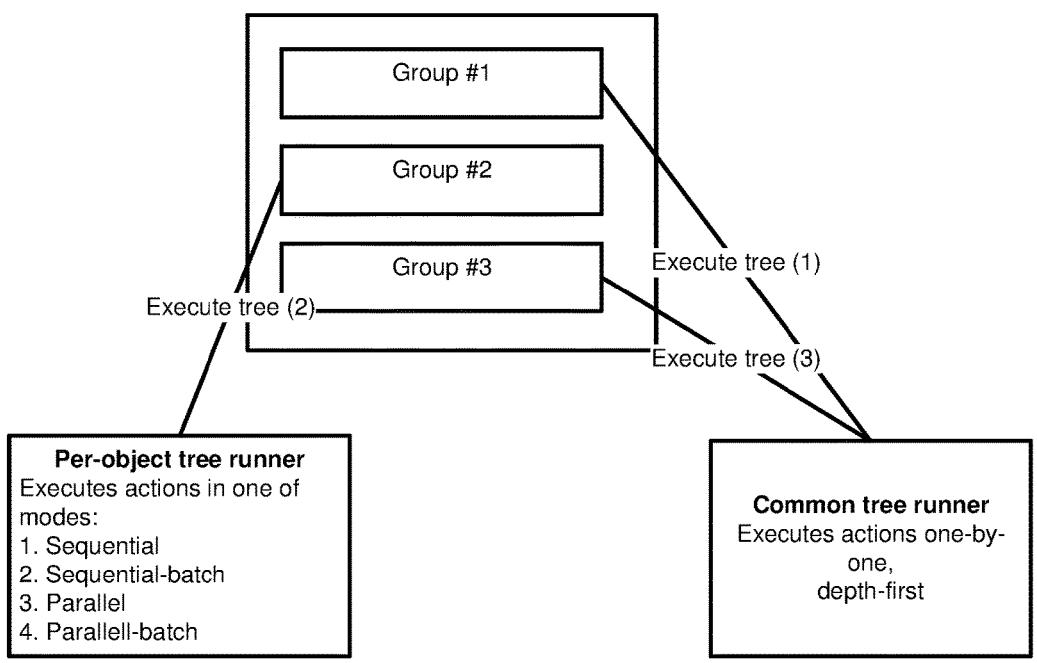
FIG. 9 illustrates the execution of the trees.

FIG. 9 illustrates the execution of the trees, keeping in mind that the actions have now been grouped into three groups, and each group contains only common actions or only per object actions. In the case of the common action groups, the common tree runner executes the actions one at a time, walking action tree with DFS (depth-first search) algorithm. The DFS algorithm is applied to a tree node and could be described as follows: if a node is a leaf action, the action is executed; if a node is a compound node, then run DFS algorithm for the first child node, after that run DFS algorithm for the second child node, and so on. The DFS algorithm starts on the root node. In the case of the per-object action group or groups, the per-objects tree runner executes the actions in pre-modes—sequential, sequential-batch, parallel or parallel-batch.

Figure 10:
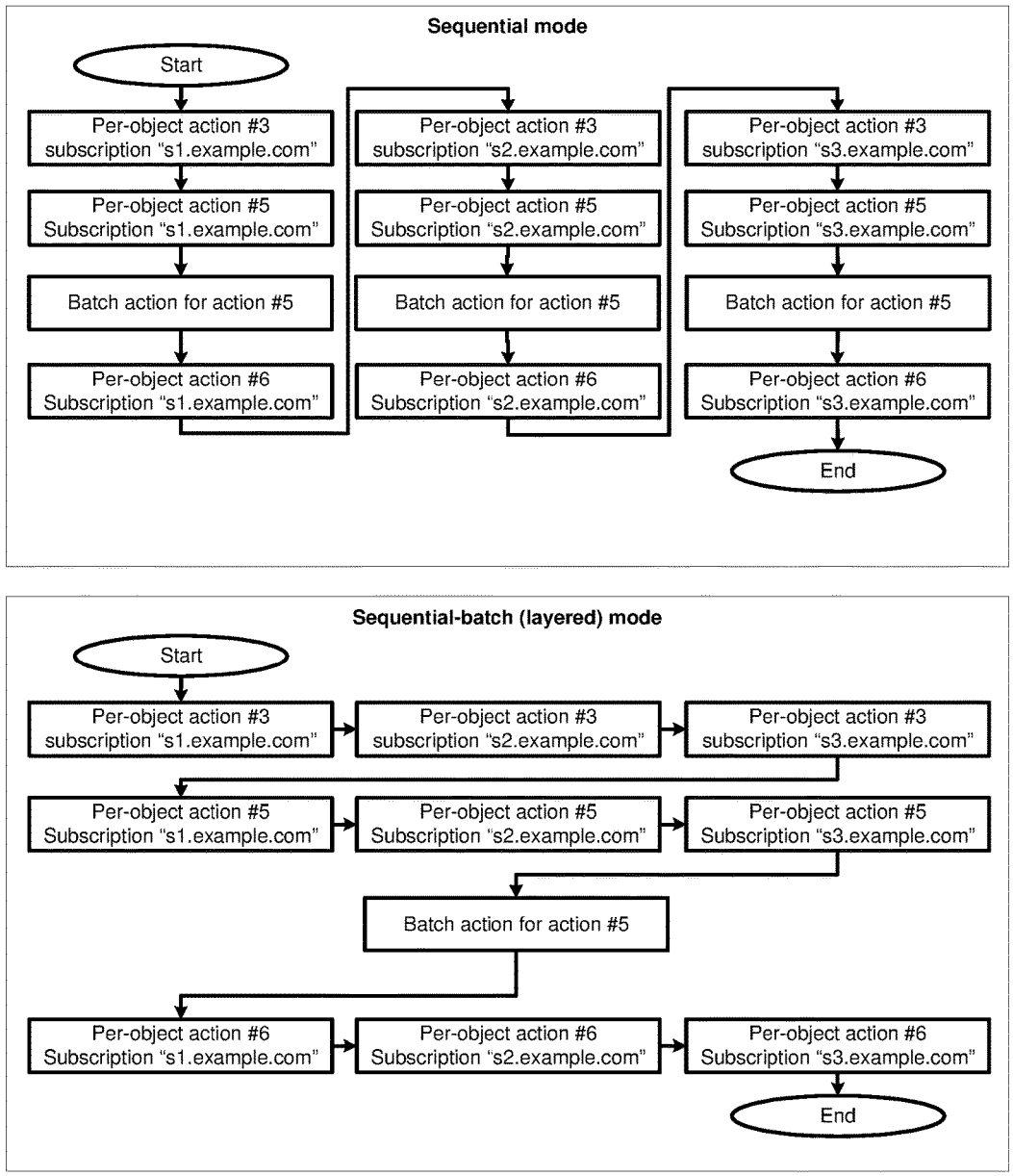
FIG. 10 illustrates the sequential modes for the per object tree runner of FIG. 9.

FIG. 10 illustrates the two sequential modes for the per object tree runner mentioned in FIG. 9. As shown in FIG. 10, at the top, it is the mode of sequential execution. At the bottom, sequential-batch mode is executed. FIG. 10 uses three subscriptions as an example—as one.example.com, as two.example.com, and as three.example.com. In the first case, first all actions for the first subscription are performed, then all actions for the second subscription are performed, and then all actions for the third subscription are performed. In the second case, i.e., the sequential-batch execution, the execution is organized by action—as may be seen in FIG. 10, the per-object action number three is performed for subscription one, two, three, then per-object action number five is performed for subscription one, two, three, and then per-objection action number six is performed for subscription one, two, three. The major difference between these two modes is execution of batch action: for sequential mode it is executed 3 times, for each migrated subscription, while for sequential-batch mode it is executed once for all subscriptions, increasing overall speed of migration.

For example, action #3 is creating domain in the target panel, action #5 is writing configuration file for web server, batch action for action #5 is restart of web server, and action #6 is transfer web files.

So, in sequential mode: "s1.example.com" is created in the target panel, then web server configuration is written for "s1.example.com", then web server is restarted, then web files are transferred for "s1.example.com", then "s2.example.com" is created in the target panel, then web server configuration is written for "s2.example.com", then web server is restarted again, then web files are transferred for "s2.example.com", then "s3.example.com" is created in the target panel, then the web server configuration is written for "s3.example.com", then the web server is restarted the $3^{rd}$ time, then web files are transferred for "s3.example.com".

In sequential-batch mode: "s1.example.com" is created in the target panel, then the web server configuration is written for "s1.example.com", then web files are transferred for "s1.example.com", then "s2.example.com" is created in the target panel, then web server configuration is written for "s2.example.com", then web files are transferred for "s2.example.com", then "s3.example.com" is created in the target panel, then web server configuration is written for "s3.example.com", and only here the web server is restarted and configuration file changes are applied for all the 3 domains, then web files are transferred for "s3.example.com".

Figure 11:
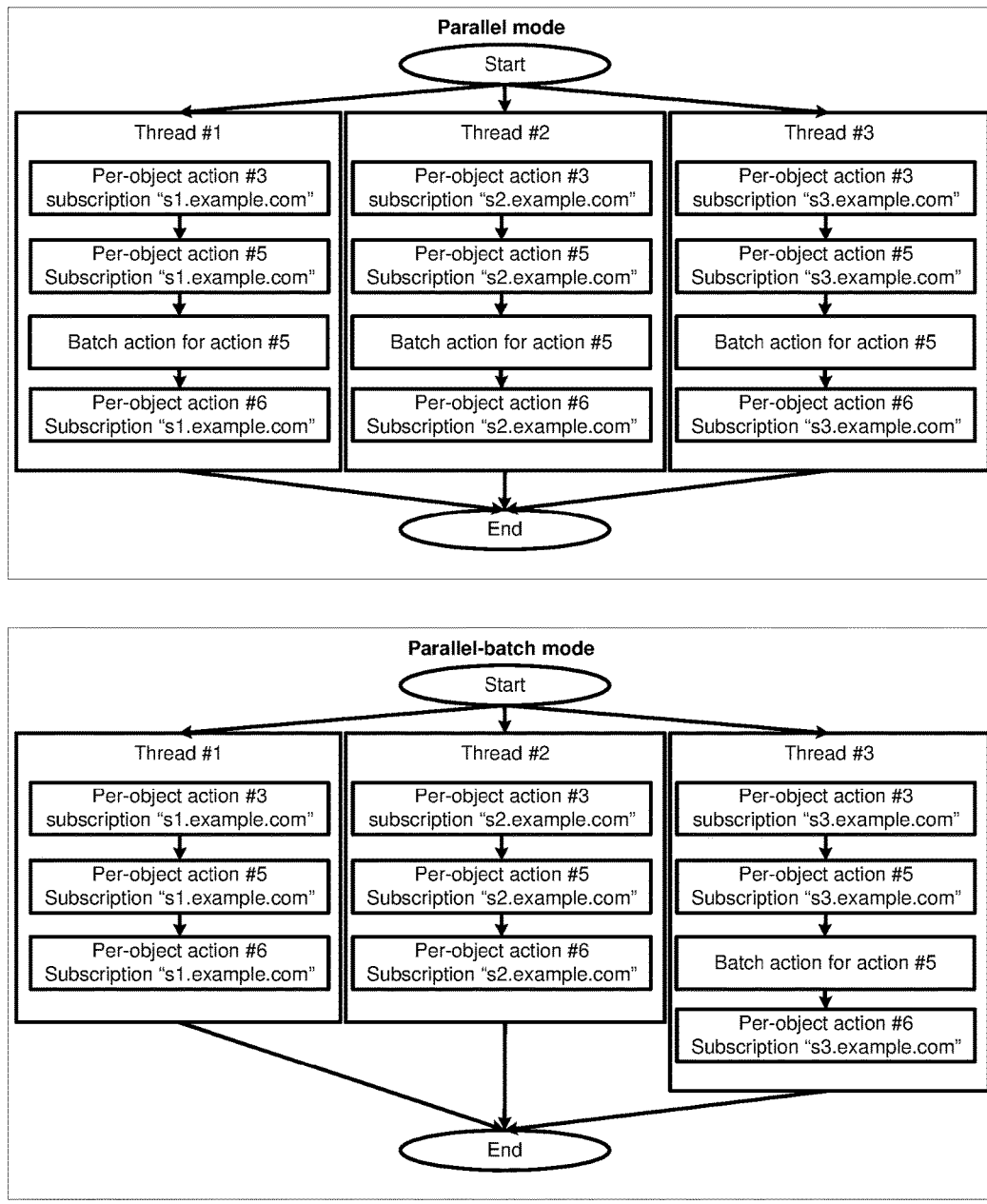
FIG. 11 illustrates the parallel modes for the per object tree runner of FIG. 9.

FIG. 11 illustrates the two parallel modes for the per object tree runner mentioned in FIG. 9. At the top parallel execution mode is shown, while at the bottom of the figure, the parallel-batch execution is shown. Both modes use multiple threads to execute the actions for each subscription in parallel. The major difference between these two modes is execution of a batch action: for parallel execution, the action is performed in each thread, while in parallel-batch mode it is performed only once for 3 subscriptions.

So, in parallel mode, 3 threads are started. In the first thread "s1.example.com" is created in the target panel, then the web server configuration is written for "s1.example.com", then the web server is restarted, then web files are transferred for "s1.example.com". In the second thread "s2.example.com" is created in the target panel, then the web server configuration is written for "s2.example.com", then the web server is restarted, then web files are transferred for "s2.example.com". In the third thread "s3.example.com" is created in the target panel, then the web server configuration is written for "s3.example.com", then the web server is restarted, then web files are transferred for "s3.example.com". All 3 threads work at the same time, for example, the first thread may create domain, while the second thread transfer web files.

In the parallel-batch mode, 3 threads are started also. In the first thread "s1.example.com" is created in the target panel, then the web server configuration is written for "s1.example.com", then web files are transferred for "s1.example.com". In the second thread "s2.example.com" is created in the target panel, then the web server configuration is written for "s2.example.com", then web files are transferred for "s2.example.com". In the third thread "s3.example.com" is created in the target panel, then the web server configuration is written for "s3.example.com", then web files are transferred for "s3.example.com". All 3 threads work at the same time, for example, the first thread may create a domain, while the second thread transfers web files.

So, in the parallel mode 3, threads are started. In the first thread "s1.example.com" is created in the target panel, then the web server configuration is written for "s1.example.com", then the web server is restarted, then web files are transferred for "s1.example.com". In the second thread "s2.example.com" is created in the target panel, then web server configuration is written for "s2.example.com", then web server is restarted, then web files are transferred for "s2.example.com". In the third thread "s3.example.com" is created in the target panel, then the web server configuration is written for "s3.example.com", then the web server is restarted, then web files are transferred for "s3.example.com". All 3 threads work at the same time, for example, the first thread may create domain, while the second thread transfer web files. The web server is restarted in one thread—the last one which writes web server configuration: in the example figure, it is the third thread.

Figure 12:
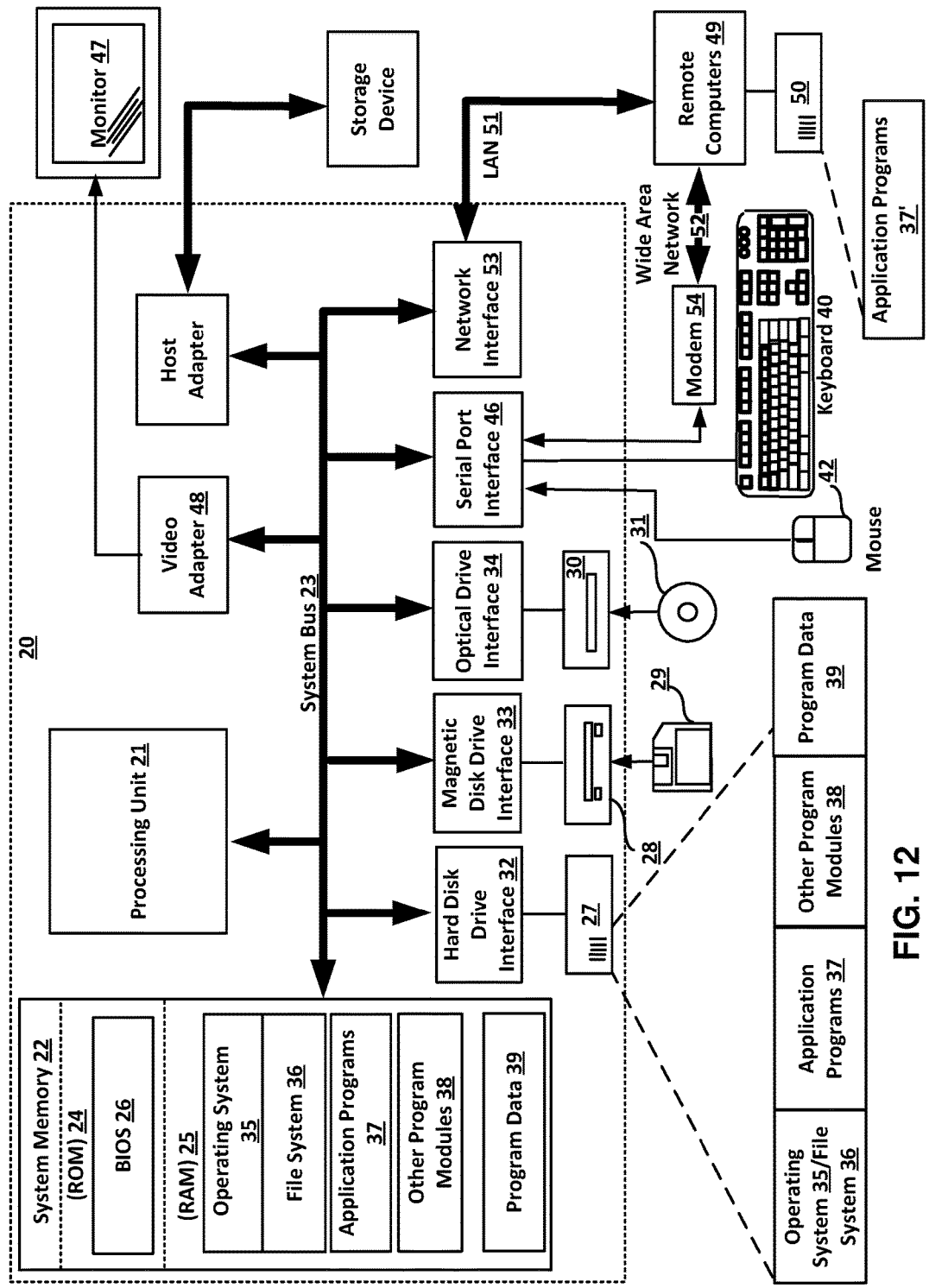
FIG. 12 shows an exemplary computer system for implementing the invention.

With reference to FIG. 12, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

APPENDIX I

```
<workflow-extension>
    <!-- add specific action to copy contents of virtual host -->
    <insert
      to="transfer-accounts/copy-content/copy-web-files"
      action="copy-virtual-host-content"
      code="/root/mypanel-migrator/copy_web_files.py">
    <!-- add specific action to warn customer about features which are not migrated -->
    <insert
      to ="check"
      action="check-not-migrated-features"
      code="/root/mypanel-migrator/check_not_migrated_features.py">
    <!-- add specific action to fix .htaccess files after migration -->
    <insert
      to "transfer-accounts/copy-content"
      after="copy-web-files"
      action="fix-htaccess-files"
      code="/root/mypanel-migrator/fix_htaccess_files.py">
    <!-- remove copy mail action: mail is not migrated from that panel -->
    <remove
      from="transfer-accounts/copy-content"
      action="copy-mail"
</workflow-extension>
```

APPENDIX II

```
[GLOBAL]
# Panel type, according to which source workflow extension will be loaded
source-type: mypanel
# Panel type, according to which target workflow extension will be loaded
target-type: PLESK
# Execution mode: sequential, sequential-batch, parallel, parallel-batch
execution-mode: parallel
# Number of worker threads for parallel execution
threads: 10
[source]
ip: 192.168.1.1
ssh-password: 123qwe
[target]
ip: 192.168.1.2
ssh-password: 123qwe
```

What is claimed is:

1. A method for migration of a hosting environment, the system method comprising:
    creating a base workflow for migration of a source machine, wherein the base workflow is organized into a tree including leaf actions and compound actions, wherein a leaf action is an atomic migration operation, and the compound action is a combination of multiple leaf actions, multiple compound actions, a leaf action and a compound action, or multiple leaf actions and multiple compound actions;
    detecting a control panel type on the target machine;
    applying workflow extensions to the base workflow for the control panel type on the target machine, to generate an extended workflow;
    detecting a control panel type on a source machine,
    wherein the control panel type on the target machine is different from the control panel type on the source machine or of the same type as on the source machine;
    applying additional workflow extensions to the extended workflow for the control panel type on the source machine, to generate a final workflow; and
    executing the final workflow to migrate a hosting environment from the source machine to the target machine and from the control panel type on the source machine to the control panel type on the target machine.

2. The method of claim 1, wherein the applying workflow extensions to the base workflow includes any of inserting, deleting and modifying operations in the base workflow.

3. The method of claim 1, wherein the applying workflow extensions to the extended workflow includes any of inserting, deleting and modifying operations in the base workflow.

4. The method of claim 1, wherein the leaf actions are any of per-object actions, batch actions and common actions.

5. The method of claim 1, wherein the final workflow is initiated through an entry point.

6. The method of claim 1, further comprising, prior to the executing step:
    making a flat list of leaf actions and compound actions with full list of their parents;
    grouping the leaf actions and compound actions by object;
    composing separate action trees by objects; and
    grouping the separate action trees into a single tree.

7. The method of claim 1, wherein final workflow is executed in parallel for multiple hosting objects.

8. The method of claim 7, wherein batch actions are executed once for several hosting objects.

9. The method of claim 1, wherein final workflow is executed sequentially for multiple hosting objects.

10. The method of claim 9, wherein batch actions are executed once for several hosting objects.

11. A computer program product comprising a non-tangible computer-readable media containing code for implementing the steps of claim 1.

12. A system for migration of a hosting environment, the system comprising:
    means for creating a base workflow for migration of a source machine, wherein the base workflow is organized into a tree including leaf actions and compound actions, wherein a leaf action is an atomic migration operation, and the compound action is a combination of multiple leaf actions, multiple compound actions, a leaf action and a compound action, or multiple leaf actions and multiple compound actions;
    means for detecting a control panel type on the target machine;
    means for applying workflow extensions to the base workflow for the control panel type on the target machine, to generate an extended workflow;
    means for detecting a control panel type on a source machine,
    wherein the control panel type on the target machine is different from the control panel type on the source machine;
    means for applying additional workflow extensions to the extended workflow for the control panel type on the source machine, to generate a final workflow; and
    means for executing the final workflow to migrate a hosting environment from the source machine to the target machine and from the control panel type on the source machine to the control panel type on the target machine.

13. The system of claim 12, wherein the applying workflow extensions to the base workflow includes any of inserting, deleting and modifying operations in the base workflow.

14. The system of claim 12, wherein the applying workflow extensions to the extended workflow includes any of inserting, deleting and modifying operations in the base workflow.

15. The system of claim 12, wherein the leaf actions are any of per-object actions, batch actions and common actions.

16. The system of claim 12, wherein the final workflow is initiated through an entry point.

17. The system of claim 12, wherein final workflow is executed in parallel for multiple hosting objects.

18. The system of claim 12, wherein batch actions are executed once for several hosting objects.

* * * * *